May 15, 1945. H. G. FERGUSON Re. 22,642

TRACTOR FOR AGRICULTURAL IMPLEMENTS

Original Filed April 14, 1943 4 Sheets-Sheet 1

Inventor
Henry G. Ferguson
By Barnes, Kisselle, Raugh & Finch
Atty.

TRACTOR FOR AGRICULTURAL IMPLEMENTS

Original Filed April 14, 1943 4 Sheets-Sheet 2

Inventor
Henry G. Ferguson
By Barnes, Kisselle, Raughlin & Raise
Atty.

TRACTOR FOR AGRICULTURAL IMPLEMENTS

Original Filed April 14, 1943 4 Sheets-Sheet 3

Inventor
Henry G. Ferguson

By Barnes, Kisselle, Raugh lin & Leisch
Atty.

May 15, 1945. H. G. FERGUSON Re. 22,642

TRACTOR FOR AGRICULTURAL IMPLEMENTS

Original Filed April 14, 1943 4 Sheets-Sheet 4

INVENTOR.
Henry G. Ferguson
BY
Barnes, Kisselle, Laughlin & Raisch
Attys.

Reissued May 15, 1945

Re. 22,642

UNITED STATES PATENT OFFICE 22,642

TRACTOR FOR AGRICULTURAL IMPLEMENTS

Henry George Ferguson, Belfast, Northern Ireland

Original No. 2,356,231, dated August 22, 1944, Serial No. 483,009, April 14, 1943. Application for reissue December 2, 1944, Serial No. 566,331. In Great Britain July 4, 1941

30 Claims. (Cl. 97—50)

This invention relates to tractors having means for the attachment of a soil-working or agricultural implement, and a power operated control unit for moving said implement up and down with reference to the tractor and supporting it on the tractor and relates more especially to a tractor having means for putting the power unit out of effective operation in accordance with the principle as disclosed in my prior Patent No. 2,118,181.

When the implement of a tractor as disclosed in the said prior patent encounters an obstruction the excess of draft pressure on the implement operates the oil control valve to allow the oil to escape from the ram so that the tractor is relieved of the implement weight and the driving wheels slip and so damage to the implement and other parts is avoided. Further, the automatic control of depth by means of the power unit is rendered ineffective so that the power unit does not tend to raise the implement as it normally does in the event of increased draft pressure. With an arrangement operating on the principle described in the said prior patent there is a tendency sometimes for the tractor and implement to oscillate backwards and forwards or "shudder" when an obstruction is encountered. The cause of this is that when the wheels spin, the draft pressure on the implement is reduced and causes the control valve to return from its oil-release position to oil-admitting position, so that the oil pressure in the ram is restored and the ram endeavors to lift the implement. If the implement is caught in an overhanging obstruction the tractive grip of the driving wheels is again increased and consequently so is the draft pressure on the implement which again causes the control valve to move to release the oil and again cause wheel spin. If this cycle is rapidly repeated there is the beforementioned undesirable "shuddering" effect and an object of the invention is to obviate this disadvantage.

An object of the invention is to provide a tractor which has means for the attachment of a soil-working or agricultural implement, a power-operated control unit for moving said implement up and down with reference to the tractor and supporting it on the tractor, and overload-release means adapted to put said control unit out of effective operation when an excess of draft pressure on the implement occurs so that the latter is no longer supported or largely supported on the tractor and slipping of the traction wheels occurs, with means for maintaining said power unit out of operation or out of operation for an appreciable time during the consequent decrease of draft pressure consequent on said slipping.

A further object of the invention is to provide a tractor which has means for the attachment of a soil-working or agricultural implement, a fluid or hydraulic pressure power unit, including a pump, a ram or equivalent pressure operable device and control valve means, said unit supporting the implement on the tractor and said valve means being under the influence of the draft pressure on the implement so as automatically to cause the power unit to raise or lower the implement to maintain the draft pressure thereon and/or the depth of cut thereof constant and so as to release the pressure on said device when there is an excess of draft pressure on the implement so that the latter is no longer supported or largely supported by the tractor and slipping of the traction wheels occurs, with means for maintaining said valve means in the pressure release position or in said position for a predetermined time despite the reduction in draft pressure on the implement consequent on said slipping.

In order that the invention may be clearly understood the following practical embodiments will be described, but merely by way of example, with reference to the accompanying drawings in which:

Fig. 1 is an elevation of a Ford tractor with a plough attached and controlled in accordance with the Ferguson system the basic features of which are disclosed in my prior patents as hereinafter referred to.

Figure 1:
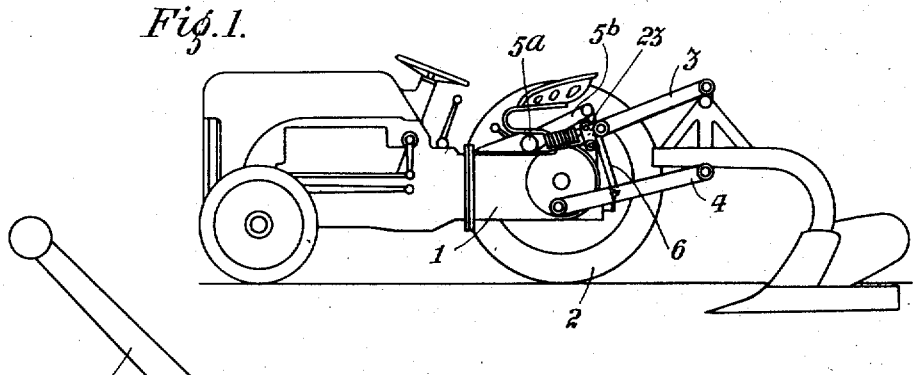

Referring especially to Fig. 1, the tractor is of the Ford-Ferguson type embodying the Ferguson linkage and implement control system. The tractor comprises a body casing 1 and the usual two rear ground wheels 2, the nearer wheel being omitted for clearness. The linkage system comprises an upper compression link 3 and two laterally spaced lower draft links 4, the links being triangularly spaced and universally attached to the tractor and implement. The tractor embodies a fluid-power unit, described later, which operates the lifting arm 5b on the rock shaft 5a and serves to raise and lower the links 4 through the drop links 6 connected with the lifting arms 5b and thus raise and lower the implement with a substantially parallel motion. As shown, the implement is a plough but it may be any other agricultural or soil-working implement adapted to be drawn through the soil. For the purpose of the present invention it is not necessary to describe the tractor in detail but reference will be made to some of the basic features of the Ferguson system. The forward convergence of the upper and lower links gives a favorable line of draft tending to keep the implement in the ground as in prior patent specification No. 1,464,130 and the implement is automatically controlled for depth of cut in accordance with the principle set out in my prior Patent No. 1,687,719; the fluid-power unit and depth control being substantially as set forth in my prior Patents Nos. 2,118,180 and 2,118,181 but with structural differences as will be seen from the following description.

The lower links 4 converge forwardly in order to cause the implement to follow closely the steering of the tractor as in my prior Patent No. 1,916,945.

Figure 5:
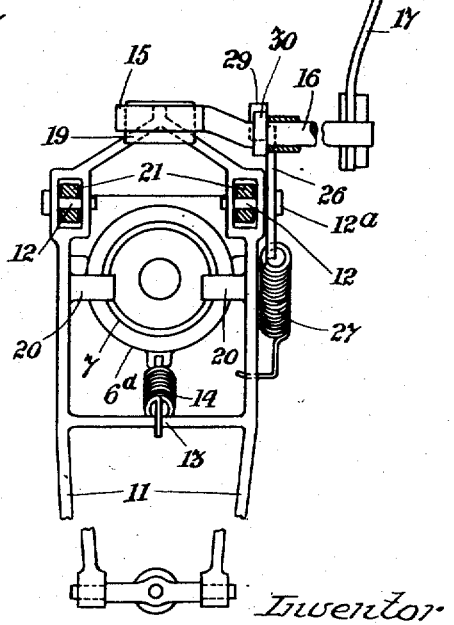
Fig. 5 is a corresponding end elevation.
Figure 6:
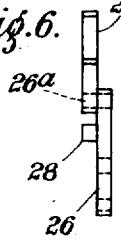
Figs. 6 and 7 are end and side detail views.
Figure 7:
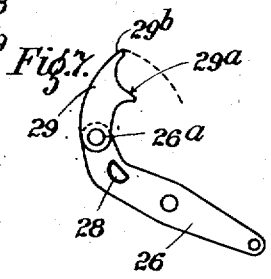

The hydraulic pressure and depth control unit includes an oil ram consisting of a cylinder 6a connected to an oil pump, not shown, and having a ram or piston 7 connected to the operating lever 5. The pump is controlled by a valve 8 adapted to control an inlet port 9 on the suction side of the pump and outlet port 10 and which is connected to a lever 11 of duplex form as shown in Fig. 5 and which is pivoted at 12, engaged at 13 by the tension spring 14 and has its top end 19 normally kept by said spring against the eccentric or cranked part 15 of the shaft 16 on which is mounted the manual control lever 17. Inasmuch as the pivot 12 and crank 15 are movable the lever 11 may be described as a "floating" lever. An adjustable stop 18 is provided to determine the maximum depth of cut of the implement. The lever also has two inward projections 20 which can act as fulcrum means and the pivot 12 is provided on a reciprocable stirrup 21 pivotally attached to a composite rod 22 and sleeve 22a pivotally attached to a duplex crank 23 which is pivoted on the tractor casing and has the compression link 3 universally attached thereto.

Figure 2:
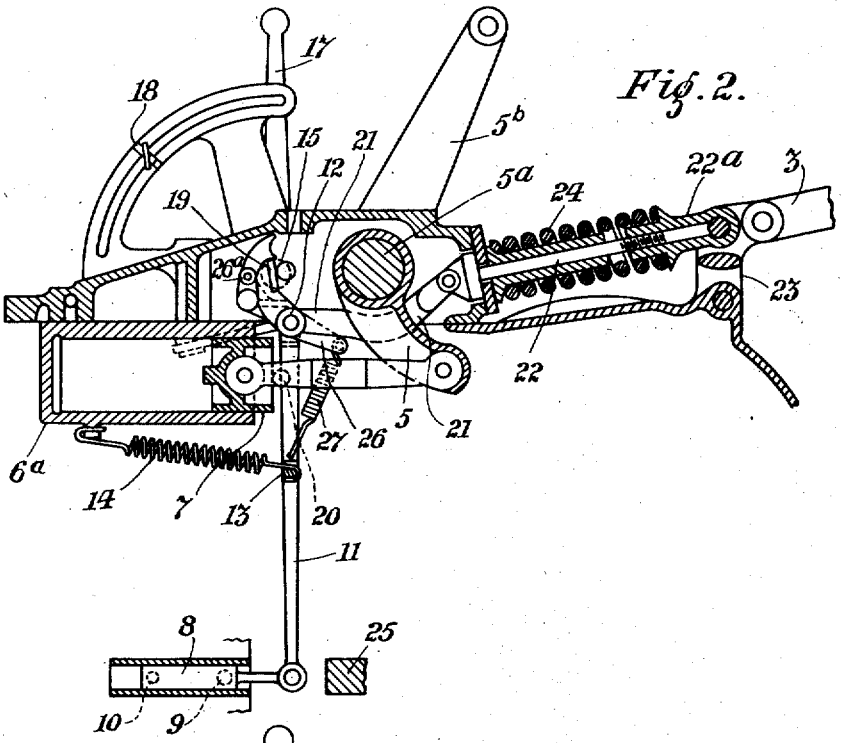
Fig. 2 is a cross sectional view to a larger scale of the hydraulic raising and lowering and depth control unit.
Figure 3:
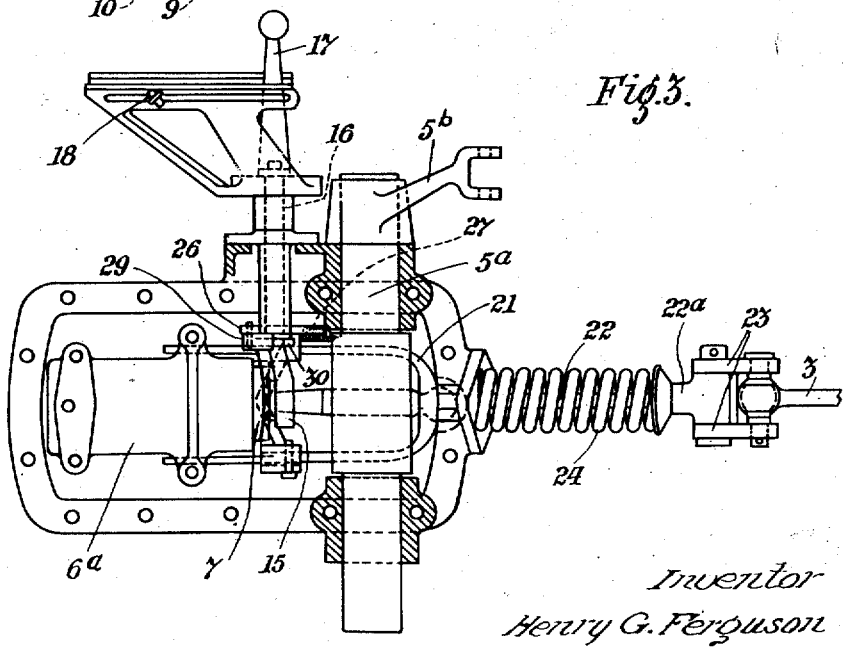
Fig. 3 is a corresponding plan view.

The arrangement so far described is known and the operation is as follows:

Fig. 2 shows the mechanism in a position corresponding to the implement having been raised, there being no compression in the link 3 and the valve 8 covering both ports 9 and 10 so that there is no movement of oil. To lower the implement to working position the manual lever 17 is moved to engage the stop 18 which has been adjusted to a position corresponding to the depth of cut required. Thereupon the eccentric 15 rotates the lever 11 anti-clockwise about the pivot 12 and moves the valve 8 to the right so that drop port 10 is uncovered and allows oil to leave the cylinder. The ram piston 7 then moves inwards and the implement sinks under its own weight until it reaches the required depth. When this occurs the consequent compression in the link 3 due to the soil or draft pressure on the implement compresses the balance spring 24 to a predetermined extent such that the pivot 12 is so moved to the left (Fig. 2) that, under the influence of the spring 14, the lever 11 rotates about its point of contact with eccentric 15 in a clockwise direction and brings the valve 8 back to the position shown in Fig. 2 and movement of oil ceases. Thereupon the implement carries on working at the predetermined depth. When the lever 17 is returned to the lift position shown in Fig. 2, the lever 11 is rotated clockwise about the pivot 12 under the action of tension spring 14 and causes valve 8 to uncover the section port 9 so that oil is pumped into the cylinder and the implement is raised until the ram 7 engages the projections 20 and moves the lever 11 to the position shown in Fig. 2.

Automatic depth control during operation is effected by raising or lowering the plow respectively as the implement goes too deep or too shallow and the draft or soil pressure increases or decreases. This control is in response to the swinging movement of the lever 11 about the engagement of its upper end 19 with crank 15 as a center produced by the shifting of the pivot 12 either to the left or right by the corresponding movements of the rod 22. Such swinging movements of the lever 11 respectively open the port 9 or 10 and cause the implement to be raised or lowered to the correct depth and this correction, through the corresponding correction in the soil pressure on the implement, returns the pivot 12 to its normal balanced position with both ports 9 and 10 closed.

Figure 4:
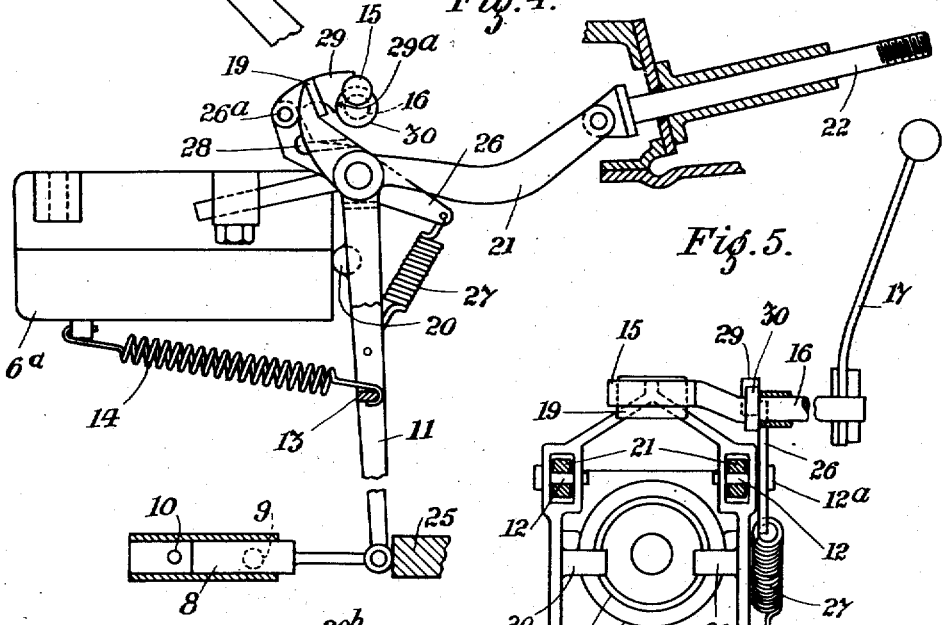
Fig. 4 is an elevation to a larger scale of the hydraulic depth control unit in a different position.

When the implement strikes an obstruction, such as a rock or root, the balance spring 24 is abnormally compressed and an excess movement beyond the normal range is imparted to the rod 22 and the associated draft-transmitting mechanism. The pivot 12 is moved to the left until the projections 20 engage the end of the cylinder 6a and the lever 11 is caused to rotate anti-clockwise, the projections 20 acting as the fulcrum, until it engages stop 25 as shown in Fig. 4. It will also be noted that the top 19 of the lever 11 has left the crank 15. The oil then leaves the cylinder through the port 10 and the weight of the implement is no longer borne by the tractor, that is, by the oil in the cylinder. Thus, as explained in prior Patent No. 2,118,181, the traction wheels 2 then spin harmlessly owing to the reduction of tractive grip, and damage, especially to the implement, is obviated or mitigated.

It has been found, however, that owing to the substantial reduction in traction consequent upon the aforesaid wheel spin there is a correspondingly substantial reduction in the compression of the spring 24, and thus the pivot 12 may move substantially back to the right (Fig. 2) so that, under the influence of spring 14, the lever 11 may be rotated about the projections 20 in clockwise direction sufficiently to cause the valve 8 to close the release port 10 and open the suction port 9 so that the oil pressure in the cylinder will be re-established and tend to lift the implement. However, if the implement is caught in an overhanging obstruction, the lifting effect will merely increase the tractive grip of the driving wheels and the overload release will again be operated. If this cycle is rapidly repeated the tractor and implement will oscillate backwards and forwards or "shudder" and may cause damage before the operator can disconnect the drive to the driving wheels.

In accordance with the invention a latch-carrier or lever 26 is pivoted on the pin 12a, that is, on the pivot 12 of the lever 11 and is normally urged by the tension spring 27 so that the projection 28 engages the edge of the top of the lever 11 and so maintains the levers 11 and 26 in predetermined relationship. The lever 26 carries a pivoted latch 29 having an arcuate face 29a whose radius is struck about the latch pivot 26a and having a stop 29b above said face 29a.

During normal operation when the top 19 of the lever 11 is in contact with the eccentric 15, the latch rests on top of the collar 30 and is inoperative as shown in Fig. 2. When an obstruction is encountered and the top 19 moves away from the eccentric 15, as shown in Fig. 4, the latch 29 falls so that the face 29a comes into engagement with the collar 30 and the stop 29b prevents further falling of the latch. Thus when the pivot 12 moves to the right due to the decreased draft pressure on the balance spring 24, the lever 11 does not rotate clockwise about the projections 28 as hitherto, but merely pivots about the abutment 25 owing to the spring 27 overcoming the effect of the spring 14. During this return movement of the pivot 12 to the right, which is in effect a lost motion between the stirrup 21 and the valve 8 or between the latch 29 and the stirrup 21 which frees the latch 29, the lever 11 and the associated parts from the considerable stress that would be set up if the balance spring were held in the compressed position by the latch when the draft is reduced by the wheel slip, the lever or latch carrier 26 is caused to rotate anti-clockwise with reference to the lever 11 and so stresses the spring 27 which allows the lost motion and helps it to overcome the effect of spring 14. At the same time, the latch 29 has an anti-clockwise movement about the collar 30. The valve 8 is thus held in the position shown in Fig. 4 and the shuddering effect is avoided. To release the latch the operator simply pulls the manual control lever 17 up to the raised position and the clockwise rolling effect of the collar 30 on the arcuate face 29a, which is frictionally engaged against the collar 30 by spring pressure, rolls up and disengages the latch 29 which rides over the collar 30, being restored to the position shown in Fig. 2 by the spring 27.

Figure 10:
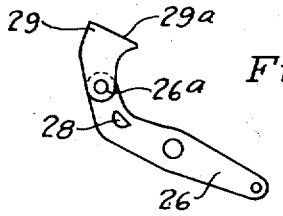
Fig. 10 shows a modification of the latch in Fig. 7.

Fig. 10 shows a modification of the latch wherein the stop projection 29b is omitted and the curved face 29a is so formed that from, at or near its lower edge upwards the radii from the latch pivot 26a to the surface 29a gradually increase. This prevents the latch falling down past the collar as there will be a wedging action which will also facilitate disengagement of the latch when control lever 17 is raised.

It will be seen from the above that the invention can be readily applied to existing tractors.

Figures 8, 9:
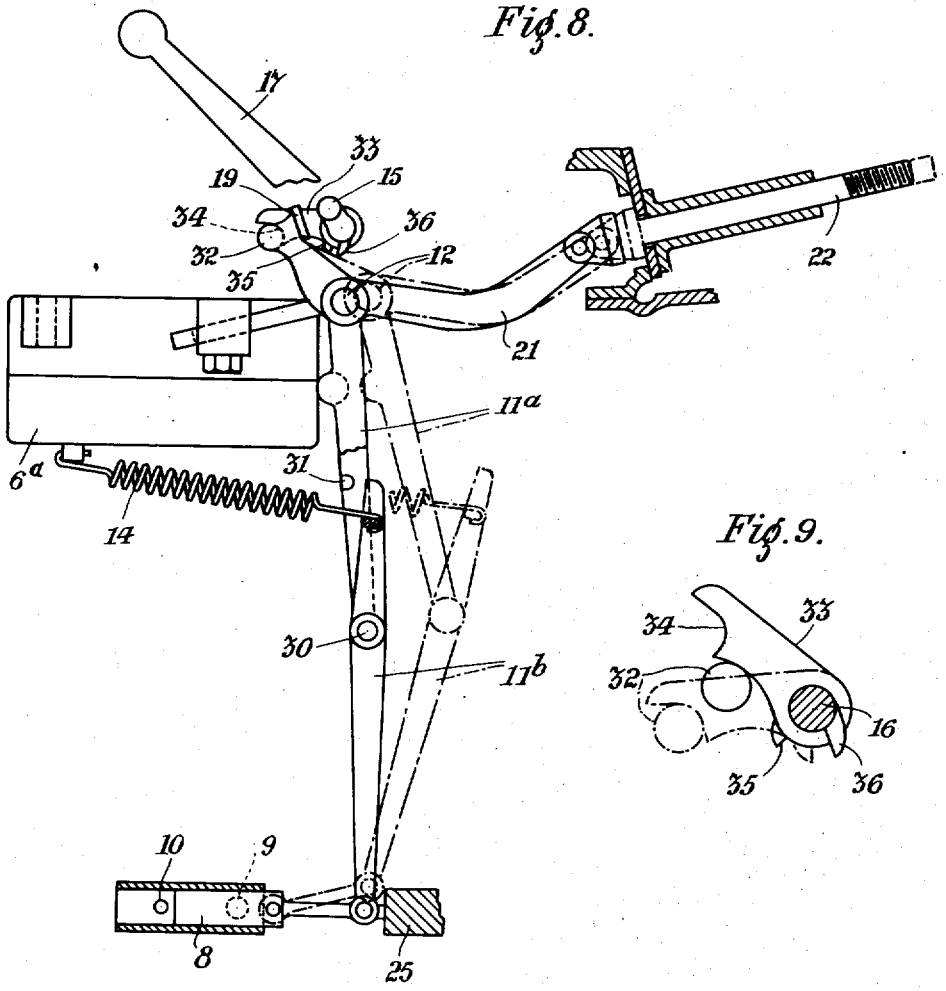
Fig. 8 is an elevation of a modified form.
Fig. 9 is a detail view to a larger scale of the latch in Fig. 8.

The modified form shown in Figs. 8 and 9 is the same as that above described except that the lever 11 is formed in two parts 11a, 11b hinged together at 40 and normally held in alignment against the stop 31 by the spring 14, the said hinge and spring providing a yielding or lost motion connection. The lever is also further modified in that it is formed with a sidewards projection pin 32 at the top which projects towards the collar 30. In this form the latch previously described is replaced by the latch 33 pivoted on a concentric portion of the shaft 16 on the left hand side of the collar 30 (Fig. 5). The latch has an arcuate latch recess 34 and a projection 35 which projects into the plane of rotation of a projection 36 on the shaft 16.

During normal operation the latch 33 rests on the projection 32 in withdrawn or inoperative position as shown in full lines in Fig. 9.

When the lever 11a, 11b is displaced to a position away from the cam or crank 15 corresponding to excess draft pressure, as shown in full lines in Fig. 8, the latch 33 falls down so that the recess 34 engages the projection 32 on the lever part 11a and is retained there and so maintains the top of the lever in the displaced position and keeps the oil control valve 8 in the release position. When the draft is correspondingly reduced owing to the wheel slip the lever 11a, 11b "breaks" about the pivot 40 and assumes the position shown in chain dotted lines in Fig. 8 and the pivot 12 and stirrup 21 move back relatively to the latch 33 and valve 8, the position of which latter remains unchanged. This lost motion relieves the latch and lever and associated parts from bearing the considerable load of the balance spring 24 which would set up considerable stress therein after the excess draft pressure has been removed. This condition as shown in the chain dotted lines on Fig. 8 is maintained until the operator moves the manual control lever 17 to raise the implement out of the ground when the projection 36 on the shaft 16 engages the projection 35 on the latch 33 and lifts it free of the lever 11 so that the "floating" lever can return under the action of spring 14 to contact with and be controlled by the cam or crank 15.

Figure 11:
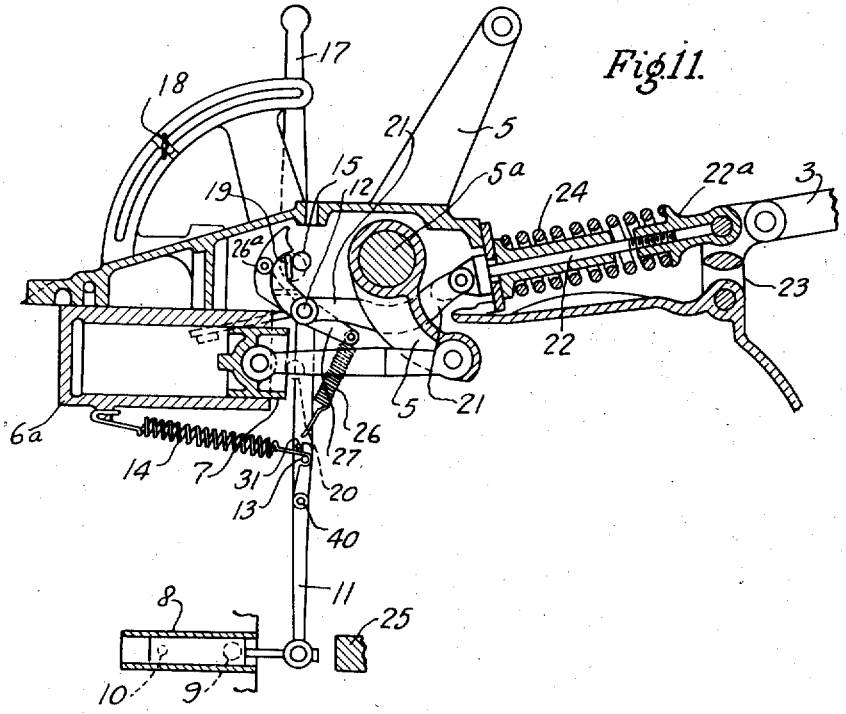
Fig. 11 is a modification of the arrangement in Fig. 2.

As shown in Fig. 11 said lost motion hinge 40 and stop 31 may also be employed in the embodiment in Figs. 1 to 5 to allow a lost motion between the lower end of the lever 11 and the other parts thereof to prevent undue stress therein under conditions where the lower end may tend to move further than allowed by the abutment 25. Both yieldable arrangements are provided as insurance against damage to the lever 11 by the failure of either of the yieldable means to function to permit the full range of movement to the right of pivot 12.

In all the arrangements shown, before raising the implement, the operator will usually back the tractor slightly to cause the implement to free the obstruction.

What I claim is:

1. In a tractor having means for the attachment of a soil-working or agricultural implement, a power-operated control unit for moving said implement up and down with reference to the tractor and supporting it on the tractor, an operator-controlled member for controlling said unit to raise or lower the implement, and overload-release means adapted to put said control unit out of effective operation when an excess of draft pressure on the implement occurs so that the latter is no longer supported or largely supported on the tractor and slipping of the traction wheels occurs; catch means for automatically maintaining said power unit out of operation during the consequent decrease of draft pressure consequent on said slipping and means on said member for rendering said catch means inoperative when said member is moved to implement-lifting position.

2. In a tractor having means for the attachment of a soil-working or agricultural implement, a power-operated control unit for moving said implement up and down with reference to the tractor and supporting it on the tractor, and for automatically raising or lowering the implement in accordance with variations in the draft pressure thereon in order to correct said variations and/or maintain the implement at a constant depth of cut, an operator-controlled member for operating said unit to raise and lower the implement, and overload release means adapted to put said control unit out of effective operation when an excess of draft pressure on the implement occurs so that the latter is no longer supported or largely supported on the tractor and slipping of the traction wheels occurs; check means for automatically maintaining said power unit out of lifting operation during the consequent decrease of draft pressure consequent on said slipping, to prevent "shuddering" of the tractor and implement, said member being arranged to render said check means inoperative when said member is moved to implement-lifting position.

3. In combination a tractor and a soil-working or agricultural implement, the tractor comprising means for movably attaching the implement thereto, a power-operated control unit for moving the implement up and down with reference to the tractor and supporting it thereon, an implement draft-transmitting connection including draft-balancing means between the implement and a control member of said unit, said control member being movable under the opposed influences of the balance means and of the draft pressure on the implement to implement lifting, holding or lowering positions and said connection including a part movable to extreme position by the draft against the action of said balance means to cause the control member to move to said lowering position to cause slipping of the tractor driving wheels when there is an excess of draft pressure on the implement, and check means associated with said part so as automatically to come into action when said part is moved to said extreme position to prevent or retard the return of said part from said position and to prevent or retard the return of said control member to implement-lifting position as a consequence of the reduction of draft pressure due to said wheel slip.

4. In combination a tractor and a soil-working or agricultural implement, the tractor comprising means for movably attaching the implement thereto, a power-operated control unit for moving the implement up and down with reference to the tractor and supporting it thereon, an implement draft-transmitting connection including draft-balancing means between the implement and a control member of said unit, said control member being movable under the opposed influences of the balance means and of the draft pressure on the implement to implement lifting, holding or lowering positions and being movable by the draft against the action of said balance means to said lowering position to cause slipping of the tractor driving wheels when there is an excess of draft pressure on the implement, a manually operable member for moving said control member and a latch member which is automatically movable on occurrence of excess draft pressure to a check position in which it prevents the return of said control member to implement-lifting position and which is withdrawable to an inoperative position by movement of said manually operable member to implement lifting position.

5. In a tractor comprising means for the attachment of an implement, a unit embodying power means for moving said implement up and down with reference to the tractor and control means movable by the draft pressure on the implement against resilient balance means to an extreme position for putting said power means out of effective relationship with the implement when there is an excess of draft on the latter in order to reduce the draft; means associated with said control means so as automatically to come into action when the control means is moved to said position to prevent the control means being immediately returned from said position and consequently to prevent the power means immediately being restored into effective lifting relationship with the implement when the draft is reduced.

6. In a tractor having means for the attachment of an implement and a power-operated control unit comprising a pump and a device operable by pressure fluid from the pump for moving the implement up and down with reference to the tractor, valve means for the device, a draft-transmitting connection including resilient balance means between the implement and valve means and movable to an extreme position corresponding to pressure-release position of the valve means by the implement for relieving the fluid pressure on said device when there is an excess of draft on the implement, resistant means operatively engageable with said connection when it moves to said extreme position to prevent the connection means and the valve means being immediately returned from said position due to the reduction in the draft consequent on the wheel slip following the release of pressure.

7. In combination a tractor and a soil-engaging implement, the tractor comprising means for attaching the implement so as to be capable of up and down movement on the tractor, a power unit comprising a pump and a device operable by pressure fluid from the pump for moving the implement up and down and supporting it on the tractor, a control valve for said device movable into fluid-admitting, holding or release positions respectively to raise, hold or lower the implement on the tractor, an implement draft-transmitting connection between the implement and valve including balance means resistant to the draft on the implement and adapted on variations of the draft of the implement to move within a normal range to cause or allow movement of the valve to raise or lower the implement to correct said variations or maintain the implement at a constant depth of cut and adapted to move beyond said range to move the valve to fluid-release position when there is an excess of draft pressure on the implement to relieve the tractor of the implement weight and cause the tractor driving wheels to slip and resistant means automatically put into operation by movement of the connection means beyond said range to prevent the immediate return of said valve by the balance means for fluid-release position to fluid-admitting position when the draft pressure is reduced by said wheel slip.

8. In combination a tractor and a soil-engaging implement, the tractor comprising means for attaching the implement so as to be capable of up and down movement on the tractor, a power unit comprising a pump and a device operable by pressure fluid from the pump for moving the implement up and down and supporting it on the tractor, a control valve for said device movable into fluid-admitting, holding or release positions respectively to raise, hold or lower the implement on the tractor, a manual control means for moving said valve, an implement draft-transmitting connection between the implement and valve including balance means resistant to the draft on the implement and adapted on variations of the draft of the implement to cause or allow movement of the valve to raise or lower the implement to correct said variations or maintain the implement at a constant depth of cut and adapted to move the valve to fluid-release position when there is an excess of draft pressure on the implement to relieve the tractor of the implement weight and cause the tractor driving wheels to slip, and latch means automatically movable into stop position, in engagement with said draft-transmitting connection to prevent immediate return of said valve by the balance means from fluid-release position to fluid-admitting position when the draft pressure is reduced and movable by said manual control means so as to be withdrawn from stop position by the movement of said manual means to a position corresponding to fluid-admitting position of the valve member.

9. In the combination of a tractor and a soil-working or agricultural implement, means for movably attaching the implement to the tractor, a power-operated control unit for moving the implement up and down with reference to the tractor and supporting it thereon, an implement draft-transmitting connection including draft-balancing means between the implement and a control member of said unit, said control member being movable under the opposed influences of the balance means and of the draft pressure on the implement to implement lifting, holding or lowering positions and being movable by the draft against the action of said balance means to said lowering position to cause slipping of the tractor driving wheels when there is an excess of draft pressure on the implement, said draft-transmitting connection comprising a part connected to the control member, a part connected to the balance means and a resilient lost motion device between said two parts, and check means to engage said first part on excess of draft pressure to check return of said control member to implement lifting position as a consequence of the reduction of draft pressure, due to said wheel slip, said lost motion device allowing return of said second part and the balance means on the reduction of draft without effect on the position of the control member.

10. In the combination of a tractor and a soil-engaging implement, means on the tractor for attaching the implement so as to be capable of up and down movement on the tractor, a power unit comprising a pump and a device operable by pressure fluid from the pump for moving the implement up and down and supporting it on the tractor, a control valve for said device movable into fluid-admitting, holding or release positions respectively to raise, hold or lower the implement on the tractor, an implement draft-transmitting connection between the implement and valve including balance means resistant to the draft on the implement and adapted on variations of the draft of the implement to cause or allow movement of the valve to raise or lower the implement to correct said variations or maintain the implement at a constant depth of cut and adapted to move the valve to fluid-release position when there is an excess of draft pressure on the implement to relieve the tractor of the implement weight and cause the tractor driving wheels to slip; a latch member automatically engageable on excess of draft pressure occurring with a part of said draft-transmitting connection to prevent the immediate return of said valve by the balance means from fluid-release position to fluid-admitting position when the draft pressure is reduced and a resilient lost motion connection between said valve and the balance means allowing the latter to return when the draft pressure is reduced from its excess draft position without altering the position of the valve.

11. In a tractor having means for connecting a soil-working implement thereto so as to be capable of up and down movement on the tractor, a hydraulic power unit comprising a pump, a pressure operable device connected thereto for raising, lowering and supporting the implement on the tractor, spaced admission and release ports for said device, a movable control valve for said ports and means for controlling the position of said valve manually and by the opposed effects of resilient balance means and the soil pressure or draft on the implement, said control means comprising manually movable means and a floating lever which is connected at spaced points to the valve and a pivot movable under the influence of the balance means and the draft and which lever is urged to bear normally at a further spaced point against said manually movable means but is adapted to move away from said means when there is an excess of draft pressure to move the valve to open the release port; a latch member adapted to interpose between said floating lever and said manual means, the latter and the latch acting as abutment means to prevent the floating lever moving the valve to close the release port and open the admission port under the influence of the balance means when the draft is reduced and a yielding lost motion connection associated with said lever to allow return movement of said pivot and balance means from excess draft position relative to the latch member without moving said valve.

12. In the combination of a tractor and an implement, means on the tractor for movably attaching the implement thereto, a power-operated control unit for moving the implement up and down with reference to the tractor and supporting it thereon, an implement draft-transmitting connection including draft balancing means between the implement and a control member of said unit, said control member being movable under the opposed influences of the balance means and of the draft pressure on the implement to implement lifting, holding, or lowering positions and being movable by the draft against the action of said balance means to said lowering position to cause slipping of the tractor driving wheels when there is an excess of draft pressure on the implement, and a latch member which is automatically movable on occurrence of excess draft pressure to a check position in which it prevents the return of said control member to implement-lifting position.

13. In the combination of a tractor and a soil-working or agricultural implement, means for movably attaching the implement to the tractor, a power-operated control unit for moving the implement up and down with reference to the tractor and supporting it thereon, an implement draft-transmitting connection including draft-balancing means between the implement and a control member of said unit, said control member being movable under the opposed influences of the balance means and of the draft pressure on the implement to implement lifting, holding, or lowering positions and being movable by the draft against the action of said balance means to said lowering position to cause slipping of the tractor driving wheels when there is an excess of draft pressure on the implement, a manually operable member for moving said control member and resistant means which is automatically movable on occurrence of excess draft pressure to a check position in which it resists the return of said control member to implement-lifting position and which is withdrawable to an inoperative position by movement of said manually operable member to implement-lifting position.

14. In the combination of a tractor and a soil-working or agricultural implement, means on the tractor for movably attaching the implement thereto, a power-operated control unit for moving the implement up and down with reference to the tractor and supporting it thereon, an implement draft-transmitting connection including draft-balancing means between the implement and a control member of said unit, said control member being movable under the opposed influences of the balance means and of the draft pressure on the implement to implement lifting, holding or lowering positions and being movable by the draft against the action of said balance means to said lowering position to cause slipping of the tractor driving wheels when there is an excess of draft pressure on the implement, said draft-transmitting connection comprising a part connected to the control member, a part connected to the balance means and a resilient lost motion device between said two parts, and means to prevent immediate return of said control member to implement-lifting position as a consequence of the reduction of draft pressure, due to said wheel slip, said lost motion device allowing return of said second part and the balance means on the reduction of draft without effect on the position of the control member.

15. In the combination of a tractor and a soil-engaging implement, means for attaching the implement to the tractor so as to be capable of up and down movement on the tractor, a power unit comprising a pump and a device operable by pressure fluid from the pump for moving the implement up and down and supporting it on the tractor, a control valve for said device movable into fluid-admitting, holding or release positions respectively to raise, hold or lower the implement on the tractor, an implement draft-transmitting connection between the implement and valve including balance means resistant to the draft on the implement and adapted on variations of the draft of the implement to cause or allow movement of the valve to raise or lower the implement to correct said variations or maintain the implement at a constant depth of cut and adapted to move the valve to fluid-release position when there is an excess of draft pressure on the implement to relieve the tractor of the implement weight and cause the tractor driving wheels to slip; resistant means operatively associable on excess of draft pressure occurring with a part of said draft-transmitting connection to prevent the immediate return of said valve by the balance means from fluid-release position to fluid-admitting position when the draft pressure is reduced and a resilient lost motion connection between said part and the balance means allowing the latter to return when the draft pressure is reduced from its excess draft position without altering the position of the valve.

16. In a tractor having means for connecting a soil-working implement thereto so as to be capable of up and down movement on the tractor, a hydraulic power unit comprising a pump, a pressure operable device connected thereto for raising, lowering and supporting the implement on the tractor, spaced admission and release ports for said device, a movable control valve for said ports and means for controlling the position of said valve manually and by the opposed effects of resilient balance means and the soil pressure or draft on the implement, said control means comprising manually movable means and a floating lever which is connected at spaced points to the valve and a pivot movable under the influence of the balance means and the draft and which lever is urged to bear normally at a further spaced point against said manually movable means but is adapted to move away from said means when there is an excess of draft pressure to move the valve to open the release port; a latch member adapted to interpose between said floating lever and said manual means, the latter and the latch acting as abutment means to prevent the floating lever moving the valve to close the release port and open the admission port under the influence of the balance means when the draft is reduced and additional means coordinated with the said floating lever, abutment and latch to shift the fulcrum of the lever from a point where movement of the lever by the action of the balance means is effective upon the control valve to a point where such movement is ineffective on the control valve.

17. In a Ferguson type of tractor-implement hookup, the combination of a tractor, a hitch provided with an upper pressure link and a lower draft link, a hydraulic lift on the tractor, a manually-controlled actuator, a valve to control said lift adapted to be operated by said actuator, an automatic depth control and overload release on the tractor including a thrust member adapted also to operate said valve and controlled by movement of the pressure link in accordance with reactions from the implement, and apparatus for connecting the thrust member to the valve and for preventing shuddering of the tractor and implement by the oscillation of the valve to repeat lifting and releasing the load of the implement upon the tractor, said apparatus comprising a lever arranged to move the valve upon actuation by the said depth and overload release, a latch thrown into operative position by the operation of the thrust member in the overload release and means operating with the latch in such operative position to condition the lever to be ineffectual to move the valve until the latch is reset to inoperative position.

18. The subject matter claimed in claim 17 but in which the "means operating with the latch in operative position to condition the lever to be ineffectual," etc., includes alternative fulcrum points for the lever and means whereby the lever is shifted, when the latch is thrown into operative position, from a fulcrum point on which the lever swings to move the valve to a second fulcrum point on which the lever swings without moving the valve.

19. The subject matter claimed in claim 17 but in which the "means operating with the latch in operative position to condition the lever to be ineffectual," etc., includes alternative fulcrum points for the lever and spring means whereby the lever is shifted, when the latch is thrown into operative position, from a fulcrum point on which the lever swings to move the valve to a second fulcrum point on which the lever swings without moving the valve.

20. The subject matter claimed in claim 17 but in which the "means operating with the latch in operative position to condition the lever to be ineffectual," etc., includes floating of the lever and three fulcrum points for the lever; one near one end for connection with the manually controlled actuator; one at an intermediate point to make the lever effectual upon the valve when moved by an excess of thrust; and one at the connection with the valve, which fulcrum point, when in use, makes the lever ineffectual to swing the valve in obedience to movement of the thrust member.

21. In a Ferguson type of tractor-implement hookup, the combination of a tractor, a hitch provided with an upper pressure link and a lower draft link and having a hydraulic lift on the tractor, a manually-controlled actuator, a valve to control said lift and adapted to be operated by said actuator, an automatic depth control and overload release including a thrust member adapted also to operate said valve and controlled by movement of the pressure link in accordance with reactions from the implement, apparatus connecting the thrust member to the valve and for preventing shuddering of the tractor and trailer by the oscillation of the valve to repeat lifting and releasing of the load of the implement upon the tractor, said apparatus comprising a connection between the thrust member and the valve which is alternately an actuating and a lost motion connection, and means actuated upon operation of the overload release to cause the connection between the thrust member and the valve to assume the lost motion phase until reset.

22. The combination claimed in claim 21 in which the alternate lost motion and actuating connection is afforded by a lever as to which the fulcrum is shifted from a point on which the lever movement moves the valve to a point on which the lever swings ineffectually so far as moving the valve.

23. The combination claimed in claim 21 in which the alternate lost motion and actuating connection is afforded by a lever with shiftable fulcrum points, one effectual and the other ineffectual to communicate movement of the thrust member to the valve, and a member actuated by the overload release movement of the thrust member together with spring means for causing such shifting of fulcrum points.

24. In combination a tractor and a soil-working or agricultural implement, the tractor comprising means for movably attaching the implement thereto, a power-operated control unit for moving the implement up and down with reference to the tractor and supporting it thereon, an implement draft-transmitting connection including draft-balancing means between the implement and a control member of said unit and a pivoted lever movable alternatively about a fulcrum to cause movement of the control member and about a further fulcrum without causing movement of the control member, said control member being movable under the opposed influences of the balance means and of the draft pressure on the implement to implement lifting, holding or lowering positions and being movable by the draft against the action of said balance means to said lowering position to cause slipping of the tractor driving wheels when there is an excess of draft pressure on the implement and resistant means effective on said lever to cause it to move about said further fulcrum so that the control member is not returned to implement-lifting position as a result of the reduction of the draft pressure due to said wheel slip.

25. In a tractor comprising means for the attachment of an implement, a unit embodying power means for moving said implement up and down with reference to the tractor and control means movable by the draft pressure on the implement to raise and lower the implement in accordance with the draft pressure and to an extreme position for putting said power means out of effective lifting relationship with the implement when there is an excess of draft on the latter in order to reduce the draft; means associated with said control means so as automatically to come into action when the control means is moved to said extreme position to prevent the control means being immediately returned from said position and consequently to prevent the power means immediately being restored into effective lifting relationship with the implement when the draft is reduced.

26. In a control unit for agricultural apparatus of the type wherein an implement is mounted on a tractor for power operated movement between an inoperative position in which the implement is unsupported and free to rest upon the ground and an operative position in which the tractor supports at least a portion of the implement's weight, said control unit having in combination means for controlling the movements of said implement between said positions including releasing means responsive to an excessive implement draft load for effecting movement of the implement to its inoperative grounded position, and restraining means acting on the releasing means to maintain the releasing means in such condition and thereby disable the control unit.

27. In a control mechanism for automatically controlling the vertical position of a tractor drawn implement with respect to the ground and the tractor and including a control unit embodying means responsive to the draft on the implement for maintaining a predetermined vertical position of the implement and responsive to an excess of draft on the implement for discontinuing the vertical support thereof, said control means having in combination a member movable by such excess draft pressure on the implement to discontinue the operation of the control unit, means operable upon the movement of said member to such position to hold it against immediate return and thereby prevent re-establishment of the operation of the control unit, and means for releasing the holding means to enable re-establishment of operation of the control unit.

28. In a tractor including means for attachment of an implement, a unit embodying power means for moving the implement up and down with respect to the tractor in response to changes in the draft, control means operated by the draft to so control the power means in such up and down movement, and to also release the power means and put the same out of effective lifting relationship with the implement to unload the tractor of the weight of the implement when there is an excess of draft due to unusual obstruction, and means coming into action on said excess draft and operating on and cooperating with such control means to keep the same in position to maintain release of the power means and prevent raising of the implement and throwing its weight upon the tractor after the excess draft has been relieved by the tractor wheels slipping, whereby alternate release and re-engagement of the power lifting means with the implement is avoided and "shuddering" prevented.

29. In a tractor including means for attachment of an implement, a unit embodying power means for moving the implement up and down with respect to the tractor in response to changes in the draft, control means operated by the draft to so control the power means in such up and down movement, and to also release the power means and put the same out of effective lifting relationship with the implement to unload the tractor of the weight of the implement when there is an excess of draft due to unusual obstruction, and means tripped by movement of the control means, when the same is actuated by excess draft to release the power means, and operating to keep the control means from again making the power means effective and prevent raising of the implement and throwing its weight upon the tractor after the excess draft has been relieved by the tractor wheels slipping, whereby alternate release and re-engagement of the power lifting means with the implement is avoided and "shuddering" prevented.

30. In a tractor including means for attachment of an implement, a unit embodying power means for moving the implement up and down with respect to the tractor in response to changes in the draft, control means operated by the draft to control the power means in such up and down movement, and to also release the power means and put the same out of effective lifting relationship with the implement to unload the tractor of the weight of the implement when there is an excess of draft due to unusual obstruction, and holding means tripped by movement of the control means, when the same is actuated by excess draft to release the power means, and operating to keep the control means from again making the power means effective and prevent raising of the implement and throwing its weight upon the tractor after the excess draft has been relieved by the tractor wheels slipping, whereby alternate release and re-engagement of the power lifting means with the implement is avoided and "shuddering" prevented.

HENRY GEORGE FERGUSON.